US010293992B2

(12) United States Patent
Zweigart, Jr. et al.

(10) Patent No.: US 10,293,992 B2
(45) Date of Patent: May 21, 2019

(54) ANTI-REFILL CLOSURE ASSEMBLY

(71) Applicant: Closure Systems International Inc., Indianapolis, IN (US)

(72) Inventors: Patrick Zweigart, Jr., Springfield, IL (US); Navaneeth Bashyam, West Lafayette, IN (US); Russell Tartock, Crawfordsville, IN (US); Daniel Elliott, Colorado Springs, CO (US)

(73) Assignee: Closure Systems International Inc., Memphis, TN (US)

( * ) Notice: Subject to any disclaimer, the term of this patent is extended or adjusted under 35 U.S.C. 154(b) by 85 days.

(21) Appl. No.: 15/023,060

(22) PCT Filed: Sep. 22, 2014

(86) PCT No.: PCT/US2014/056760
§ 371 (c)(1),
(2) Date: Mar. 18, 2016

(87) PCT Pub. No.: WO2015/042518
PCT Pub. Date: Mar. 26, 2015

(65) Prior Publication Data
US 2016/0229601 A1    Aug. 11, 2016

Related U.S. Application Data

(60) Provisional application No. 61/880,560, filed on Sep. 20, 2013.

(51) Int. Cl.
*B65D 49/02* (2006.01)
*B65D 41/32* (2006.01)
(Continued)

(52) U.S. Cl.
CPC ........... *B65D 49/02* (2013.01); *B65D 41/325* (2013.01); *B65D 47/12* (2013.01); *B65D 47/32* (2013.01); *B65D 49/04* (2013.01); *F16K 15/021* (2013.01)

(58) Field of Classification Search
CPC ...... B65D 49/02; B65D 41/325; B65D 47/12; B65D 47/32; B65D 49/04; F16K 15/021
(Continued)

(56) References Cited

U.S. PATENT DOCUMENTS 281,611 A  *  7/1883  Burnett ................. B65D 49/04
                                                      222/147
959,186 A  *  5/1910  Wilson .................. B65D 49/04
                                                      215/28

(Continued)

OTHER PUBLICATIONS

International Search Report and Written Opinion dated Dec. 16, 2014.

*Primary Examiner* — Patrick M. Buechner
*Assistant Examiner* — Michael J. Melaragno
(74) *Attorney, Agent, or Firm* — Nixon Peabody LLP

(57) ABSTRACT

An anti-refill closure assembly comprises a closure body having an upper spout portion and a lower fitment portion configured for securement to an associated container. The closure body defines at least one flow passage through which liquid from the container enters the closure body. A reciprocable valve member is positioned within the closure body for movement between opened and closed positions. In the opened position of the valve member, liquid from within the container flows into the closure body through the at least one flow passage, and past the valve member outwardly through the upper spout portion. In the closed position of the valve member, the valve member acts to prevent the reverse flow of liquid from the outer spout portion back through the valve body and into the associated container. The reciprocable (Continued)

valve member acts to permit normal dispensing of liquid from within the container in the open position of the valve member, but acts in the nature of a one-way check valve to inhibit and prevent flow of liquid through the closure body back into the container.

38 Claims, 5 Drawing Sheets

(51) Int. Cl.
  *B65D 49/04* (2006.01)
  *B65D 47/12* (2006.01)
  *B65D 47/32* (2006.01)
  *F16K 15/02* (2006.01)
(58) Field of Classification Search
  USPC .......................................... 222/495, 147, 566
  See application file for complete search history.

(56) References Cited

U.S. PATENT DOCUMENTS

| | | | | |
|---|---|---|---|---|
| 1,027,413 | A * | 5/1912 | Fortunesco | B65D 49/04 215/21 |
| 1,038,566 | A * | 9/1912 | Greaves | B65D 49/04 215/25 |
| 1,054,982 | A * | 3/1913 | Mulvehill | B65D 49/02 215/30 |
| 1,750,591 | A * | 3/1930 | Hafermann | B65D 49/02 215/15 |
| 1,994,625 | A | 3/1935 | Tivoli | |
| 3,084,822 | A * | 4/1963 | Guala | B65D 49/02 215/21 |
| 3,456,650 | A * | 7/1969 | Schwartzman | B65D 47/2075 215/260 |
| 4,043,473 | A * | 8/1977 | Webb | B65D 49/02 215/21 |
| 4,232,795 | A * | 11/1980 | Vigna | B65D 41/58 215/21 |
| 4,261,484 | A * | 4/1981 | DaCosta | B65D 49/02 222/500 |
| 4,382,520 | A * | 5/1983 | Aleff | B65D 49/06 215/21 |
| 4,497,415 | A * | 2/1985 | Arona Delonghi | B65D 49/02 215/21 |
| 5,303,853 | A | 4/1994 | Nye | |
| 5,743,437 | A * | 4/1998 | Moore | B65D 41/3419 215/21 |
| 5,947,310 | A * | 9/1999 | Wagner | B65D 23/04 215/219 |
| 6,230,937 | B1 * | 5/2001 | Johnson | B65D 49/04 222/147 |
| 6,357,614 | B1 | 3/2002 | Kerr | |
| 6,854,612 | B2 * | 2/2005 | Thomson | B65D 49/04 215/21 |
| 6,908,013 | B2 * | 6/2005 | Thomson | B65D 49/04 215/251 |
| 7,398,890 | B2 * | 7/2008 | Thomson | B65D 49/04 215/21 |
| 7,607,549 | B2 * | 10/2009 | Morini | B65D 41/3438 206/219 |
| 2002/0005415 | A1 * | 1/2002 | De Laforcade | B65D 47/2075 222/212 |
| 2004/0129729 | A1 * | 7/2004 | Thomson | B65D 41/62 222/153.06 |
| 2006/0151422 | A1 * | 7/2006 | Manley | B65D 39/08 215/341 |
| 2014/0116009 | A1 * | 5/2014 | Herman | B65D 23/02 53/467 |
| 2014/0230953 | A1 * | 8/2014 | Hearon | B67D 7/0283 141/2 |
| 2015/0114513 | A1 * | 4/2015 | Hearon | B65B 55/10 141/1 |
| 2015/0197380 | A1 * | 7/2015 | Bashyam | B65D 47/243 222/522 |

* cited by examiner

ANTI-REFILL CLOSURE ASSEMBLY

TECHNICAL FIELD

The present invention relates generally to a closure assembly including features for controlling liquid flow through the assembly, and more particularly to an anti-refill closure assembly which inhibits introduction and flow of liquid through the closure assembly into an associated container, to thereby limit unauthorized introduction of adulterated or inferior-grade product, or other liquid into the associated container through the valve assembly.

BACKGROUND OF THE INVENTION

Various types of tamper-evident closures are known which function to alert consumers that the closure has been previously partially or completed removed from an associated container. For some applications, however, it is further desired that a closure function to prevent refilling of an associated container, after the original contents thereof have been dispensed from the container. Experience has shown that "anti-refill" closures of this nature can be particularly desirable for use on containers having relatively expensive contents, such as spirits or the like. Use of these types of "anti-refill" or "anti-counterfeiting" closures are desirable in order to prevent introduction of adulterated, inferior-grade, or otherwise non-original product back into a container after the original product has been dispensed. As will be appreciated, closures of this nature should function to permit convenient dispensing of the original contents of the container, while at the same time preventing, or substantially inhibiting, re-introduction of liquid back into the container.

The present invention contemplates an anti-refill closure assembly which functions to permit convenient dispensing of the original contents of an associated container, while significantly inhibiting and preventing introduction of liquid back into the container.

SUMMARY OF THE INVENTION

In accordance with the present invention, an anti-refill closure assembly comprises a closure body having an upper spout portion, and a lower fitment portion configured for securement to an associated container. The closure body defines at least one flow passage through which liquid from the container enters the closure body, and a valve seat surrounding the flow passage. The closure body includes a centrally-positioned guide element.

The present closure assembly further includes a reciprocable valve member positioned within the closure body for movement between opened and closed positions. In the illustrated embodiments, the valve member has a generally piston-like configuration, including a circular valve head, and a valve shaft extending downwardly from the valve head. The circular valve head is configured for engagement with the valve seat defined by the closure body in the closed position of said valve member. The valve shaft extending downwardly from the valve head is slidably mounted in the guide element of said closure body to provide reciprocable movement of said valve member.

In the opened position of the valve member, liquid from within the container flows into the closure body through the at least one flow passage, and past the valve member outwardly through the upper spout portion. In the closed position of the valve member, the valve member acts to prevent the reverse flow of liquid from the upper spout portion back through the valve body and into the associated container. The reciprocable valve member acts to permit normal dispensing of liquid from within the container in the opened position of the valve member, but acts in the nature of a one-way check valve to inhibit and prevent flow of liquid through the closure body back into the container in the closed position of the valve member.

In one illustrated embodiment, the present closure assembly further includes at least one vent flow path which provides communication between the interior of the closure body, downstream of the valve member, and the exterior of the closure body. In this fashion, liquid introduced into the closure body through the upper spout portion can flow outwardly through the vent flow path when the valve member is in its closed position. This desirably acts to inhibit refilling of the container, since efforts to introduce liquid back into the container through the closure assembly, past the valve member, result in liquid flowing outwardly through the vent flow path. In the illustrated embodiment, the vent path feature is generally hidden from view, and creates flow into the region between the container and its anti-rotation, tamper-evident sleeve.

In one embodiment, the closure body defines a plurality of internal, relatively small, elongated flow passages through which liquid from the container enters the closure body. These relatively small flow passages, which function somewhat in the nature of capillary tubes, function to permit liquid flow out of the container in a normal fashion, but significantly inhibit efforts to introduce liquid back into the container particularly if the liquid is introduced under significant pressure. Additionally, some of the flow passages function to vent air into the container while product is dispensed, promoting smooth and controlled flow.

While the specific configuration of the present invention can be varied in accordance with the present disclosure, it is contemplated that the closure body can define at least ten of ten of the relatively small, elongated flow passages, arranged in parallel relationship with each other. The arrangement of the flow passages is such that during normal dispensing of liquid from the container, some of the flow passages permit venting of air back into the container, thus facilitating smooth flow of liquid from within the container, without "chugging" or "vacuum lock" as can occur without proper venting. In a preferred embodiment, the closure assembly includes an outer cover for fitment to the closure body to close the upper spout portion thereof.

The outer cover can include a locking element which extends through the upper spout portion for engaging the valve head of the valve member and maintaining the valve member in its closed position when the outer cover is fitted to the closure body.

Notably, in accordance with an alternative embodiment, the valve head of valve member can be configured to define an upwardly facing, non-horizontal surface, which may be generally convex or domed. By this arrangement, unauthorized introduction of liquid into the spout portion of the closure assembly causes lateral liquid flow to impinge on the surface of the valve head to induce a vertical force component in the valve member to urge the valve member into engagement with annular valve seat. To further inhibit reverse liquid flow, the annular valve seat can be recessed to receive a peripheral portion of the valve head of the valve member, to thereby limit exposure of a lower surface of the valve head to liquid pressure from liquid introduced into the closure assembly through the upper spout portion.

Notably, in the illustrated embodiments, the upper spout portion has a geometry which acts to prevent a syringe, wire, or other implement from being introduced into the closure body in order to defeat or manipulate the one-way action of the valve member.

Other features and advantages of the present invention will be readily apparent from the following detailed description, the accompanying drawings, and the appended claims.

DETAILED DESCRIPTION

Figure 1:
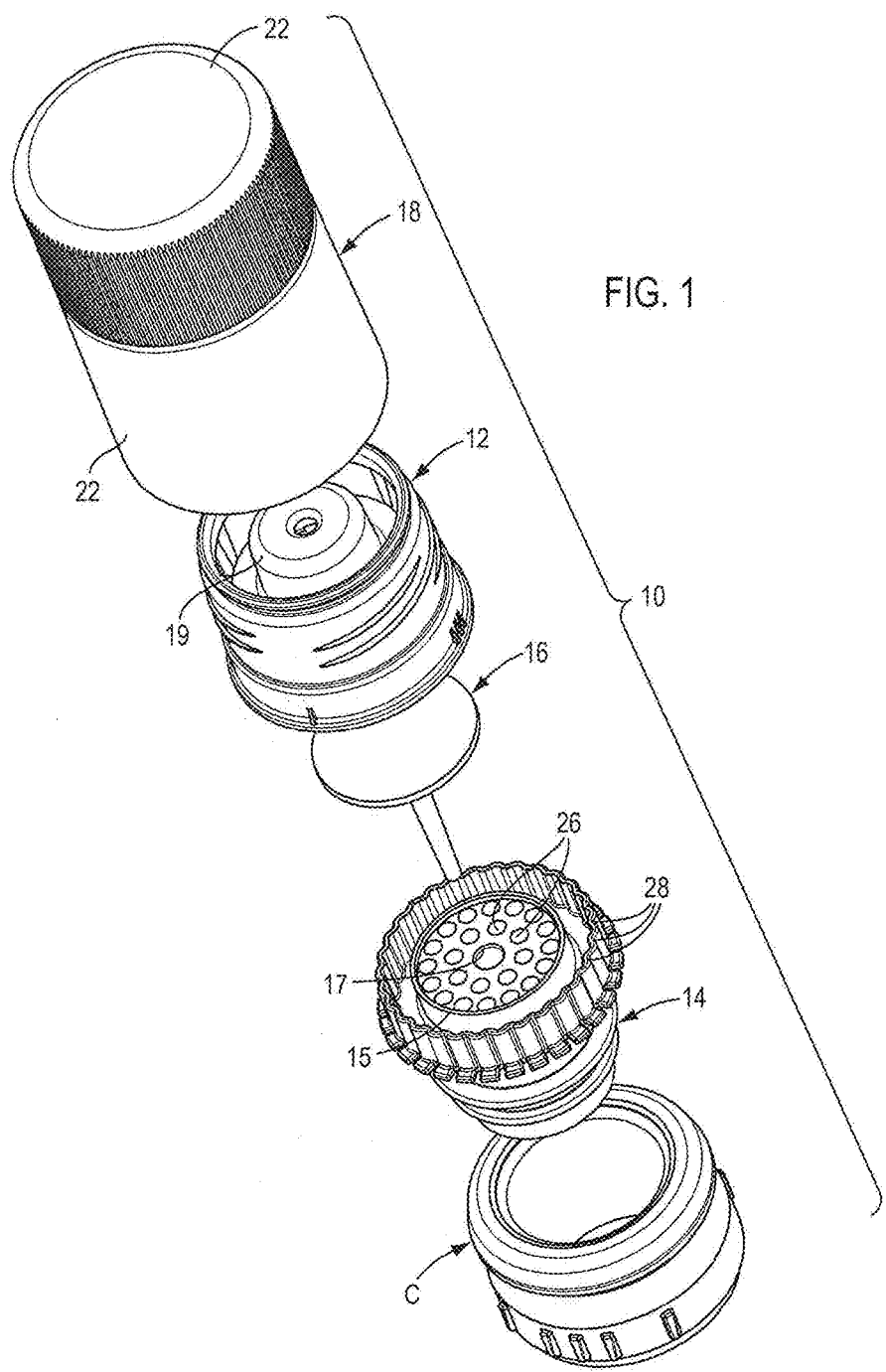
FIG. 1 is an exploded isometric view of a closure assembly embodying the principles of the present invention.

While the present invention is susceptible of embodiment in various forms, there is shown in the drawings will hereinafter be described a presently preferred embodiment, with the understanding that the present disclosure is to be considered to as an exemplification of the invention, and is not intended to limit the invention to the specific embodiment illustrated.

Figure 2:
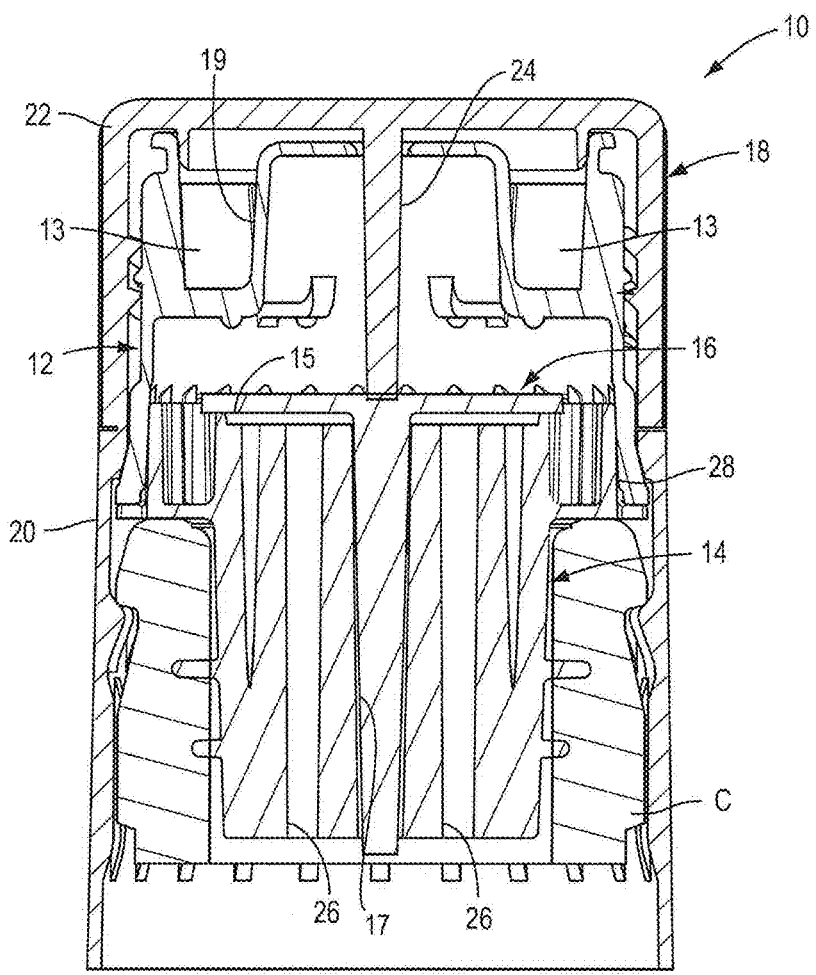
FIG. 2 is a cross-sectional view of the, present closure assembly.

With reference now to FIGS. 1 and 2, therein is shown an anti-refill closure assembly 10 embodying the principles of the present invention. Closure assembly 10 is configured for fitment to an associated container C, and functions to permit convenient dispensing of liquid contents from the container, while inhibiting and substantially preventing refilling of the container through the closure assembly. This desirably acts to prevent refilling of the container with adulterated or inferior quality product, or other liquid.

As illustrated, the present closure assembly 10 includes a closure body comprising an upper spout portion 12 joined to a lower fitment portion 14 configured for securement to the neck portion, or finish, of the associated container C. The upper spout portion 12 defines a plurality flow openings 13 at a central element 19.

The closure assembly further includes a reciprocable valve member 16 positioned in the closure body generally between the upper spout portion 12 and the lower fitment portion 14. The valve member has a piston-like configuration, including a circular valve head, and a valve shaft extending through a centrally opening in the lower fitment portion 14 which functions as a centrally-positioned guide element 17 for guiding the reciprocable movement of the valve member. The valve member 16 is movable between opened and closed positions. Upper spout portion 12 is joined to lower fitment portion 14 so that valve member 16 is held captive therein for reciprocable movement within the closure body.

The closure assembly further includes an outer cover 18 for fitment to the closure body for closing the upper spout portion 12. Outer cover 18 is preferably configured to provide tamper-evidence, and to this end, includes a lower sleeve portion 20 configured for non-removable fitment to container C, and an upper internally thread cap portion 22 joined to the lower sleeve portion 20 by a suitable frangible connection.

As will be appreciated, the reciprocable valve member 16 functions in the nature of a one-way check valve to permit liquid to flow out of container C and through the closure body and out of the upper spout portion 12, while acting to prevent the reverse flow of liquid through the closure body and into the container. FIG. 2 illustrates the valve member 16 in its closed position against a annular valve seat 15 defined by the lower fitment portion 14. In the preferred form, the outer cover 18 includes a stud-like locking element 24 which extends through a central dispensing opening in the element 19 of the upper spout portion 12 for engagement with the valve head of the valve member 16 to maintain the valve member in its closed position when the outer cover is fitted to the closure body (see FIG. 2.)

Thus, in an opened position of the reciprocable valve member 16, wherein it is displaced from the valve seat 15 defined by lower fitment portion 14, liquid can flow outwardly from within the container and into the closure body through the at least one flow passage 26 defined by the lower fitment portion. In the closed, lowered position of the valve member 16, the valve member engages the valve seat 15 and acts to prevent reverse flow of liquid from within the upper spout portion 12 through the valve body into the associated container C.

In this illustrated embodiment, the lower fitment portion 14 of the closure body defines a plurality of relatively small, elongated flow passages 26 which collectively permit liquid to flow from the container while venting air into the container, but which desirably act to inhibit flow of liquid into the container, particularly if the liquid is introduced under pressure, such as during an attempt to refill the container. It is contemplated that at least ten (10) of the relatively small flow passages be provided in parallel relationship with each other, with each have an internal diameter of about 0.020-0.3 inches, but it will be appreciated the specific numbering and dimensioning of the passages can be varied while keeping with the principles disclosed herein.

As liquid flows from within the container air can vent into the container via some of the flow passages 26. Thus, by the combination of the one-way check valve action of the valve member 16, together with the flow-restricting characteristics of the flow passages 26, refilling of the container by introduction of liquid through the upper spout portion 12 is substantially inhibited and prevented.

An additional feature of the present closure assembly further acts to inhibit refilling of the container C. Specifically, the closure assembly defines at least one vent flow path which provides communication between the interior of the closure body, downstream of the valve member 16, and the exterior of the closure body. In the illustrated embodiment, a plurality of vent flow paths 28 are defined generally about the periphery of the lower fitment portion 14. These flow paths inhibit refilling of the container since efforts to introduce liquid back into the container, particularly under pressure, will result in liquid flowing outwardly through the flow paths rather than past the valve member 16.

Figure 3:
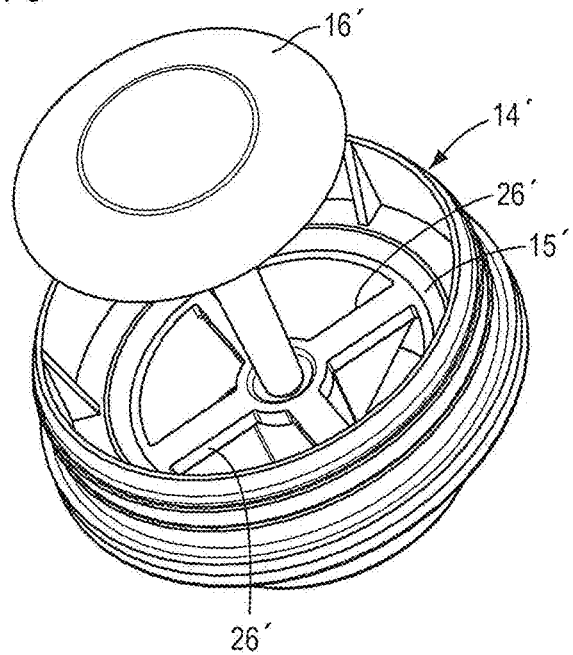
FIG. 3 is a isometric view of an alternative embodiment of a lower fitment portion of a closure body of a closure assembly embodying the present invention, shown with and associated valve member.
Figure 4:
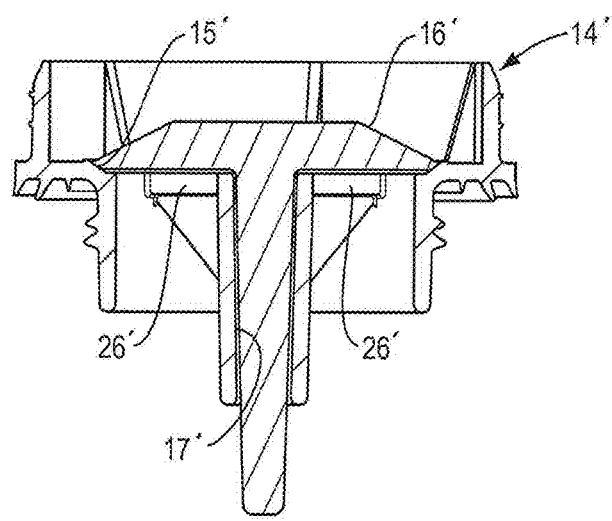
FIG. 4 is a diagrammatic, cross-sectional view of the lower fitment portion and valve member shown in FIG. 3.

FIGS. 3 and 4 illustrate an alternative configuration of the lower fitment portion of the closure assembly, with this form of the lower fitment portion designated 14'. In this embodiment, the plurality of relatively small flow passages are not provided, but rather four (4) flow passages 26' are provided surrounding centrally-positioned guide element 17.

Notably, in this embodiment, the circular valve head of the valve member 16' defines an upwardly facing, non-horizontal surface, which in the illustrated form is generally convex or domed. In the event that an unauthorized attempt is made to introduce liquid through the upper spout portion of the closure assembly, liquid will flow from the generally annular flow path defined by the upper spout portion, and create flow which moves laterally against the upwardly facing valve head of the valve member 16. Such lateral liquid flow impinges on the non-horizontal surface of the valve head to induces a vertical force component in the valve member to urge said valve member into engagement with annular valve seat 15'. Enhanced resistance to reverse flow is desirably achieved.

Additional resistance to reverse flow is achieved by recessing the annular valve seat 15' to receive a peripheral portion of valve head of valve member 16 (see FIG. 4). This arrangement desirable acts to limit exposure of the lower surface of the valve head to liquid pressure from the authorized introduction of liquid into closure assembly through the upper spout portion.

Figure 5:
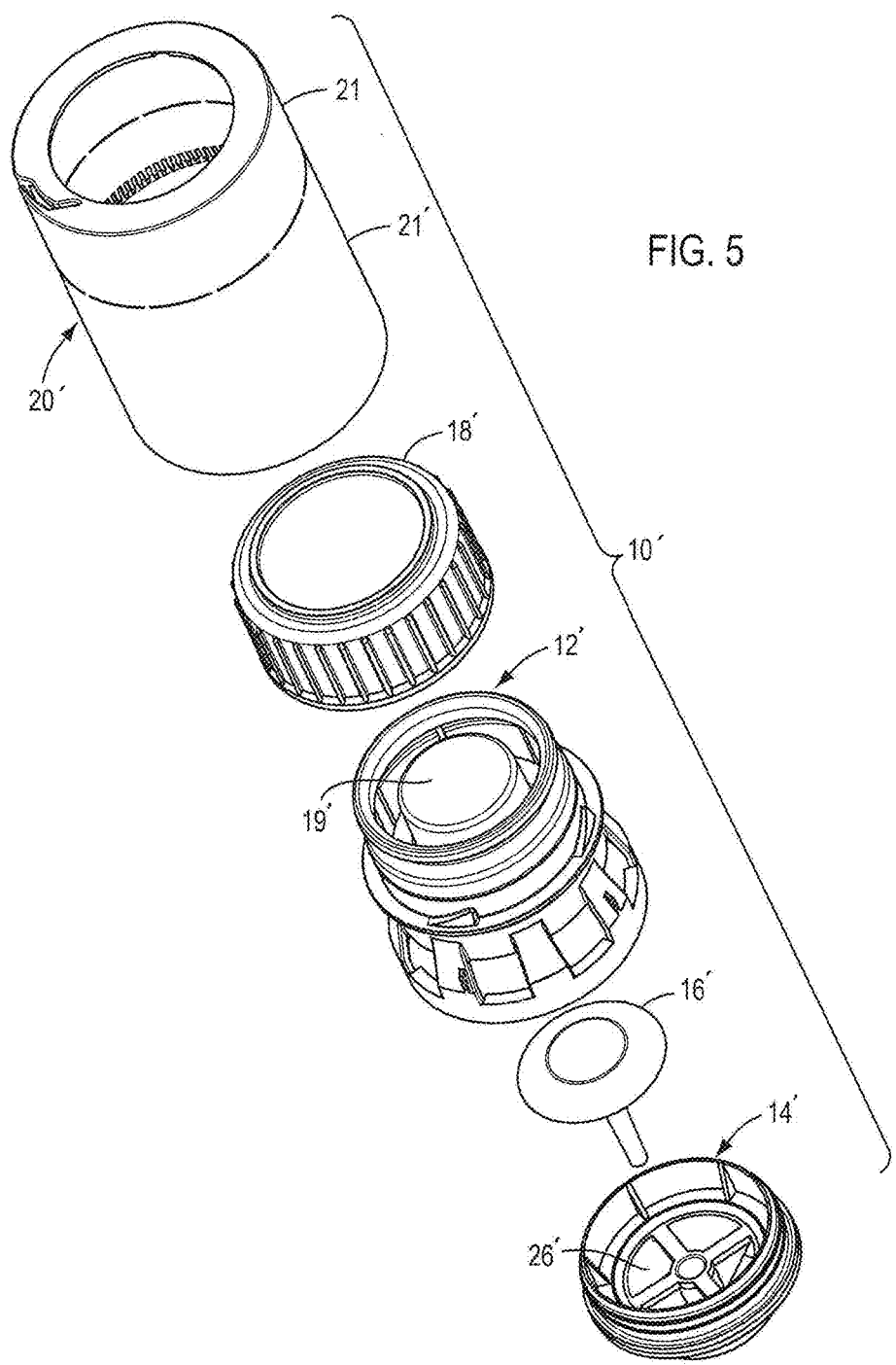
FIG. 5 is an exploded isometric view of the alternative embodiment of the present closure assembly including the lower fitment portion shown in FIGS. 3 and 4.
Figure 6:
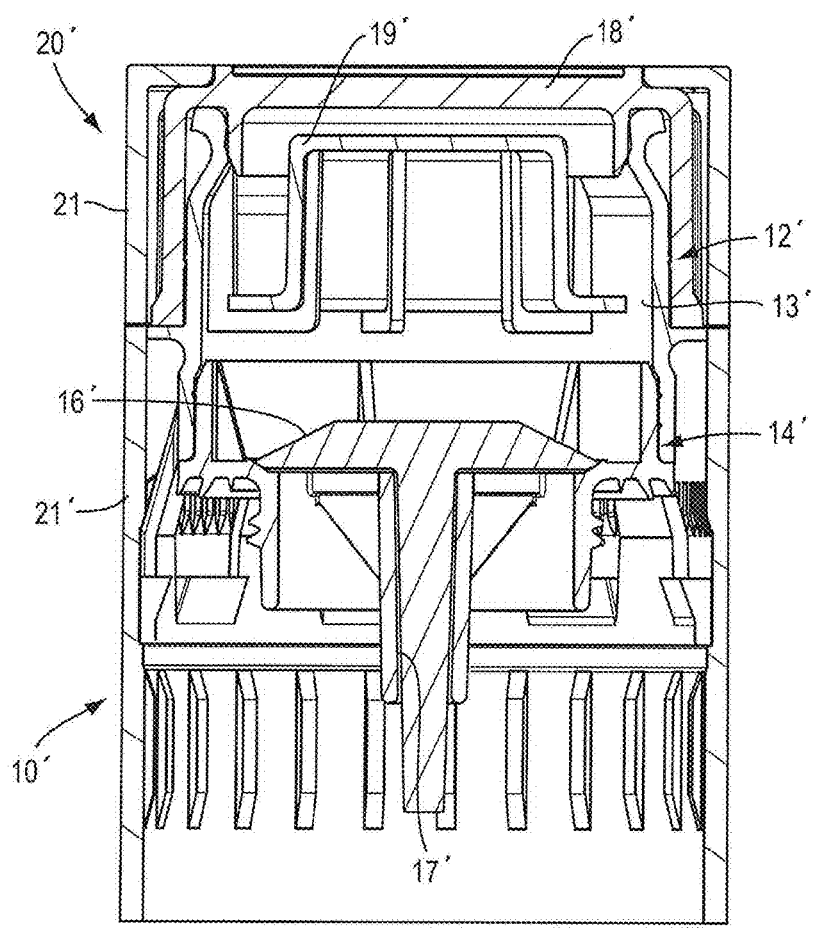
FIG. 6 is a cross-sectional view of the embodiment of the present closure assembly shown in FIG. 5.

FIGS. 5 and 6, illustrate the alternative embodiment of the present closure assembly, designated 10', including the lower fitment portion 14' and valve member 16'. As in the previous embodiment, closure assembly 10' is configured for fitment to an associated container (not shown), and functions to permit convenient dispensing of liquid contents from the container, while inhibiting and substantially preventing refilling of the container through the closure assembly.

As illustrated, the present closure assembly 10' includes a closure body comprising an upper spout portion 12' joined to the lower fitment portion 14' configured for securement to the neck portion, or finish, of the associated container. The upper spout portion 12' defines a plurality flow openings 13' at a central element 19'.

The reciprocable valve member 16' positioned in the closure body generally between the upper spout portion 12' and the lower fitment portion 14'. The piston-like valve member 16' includes a circular valve head, and a valve shaft extending through a central opening in the lower fitment portion 14' which functions as a centrally-positioned guide element 17' for guiding the reciprocable movement of the valve member. The valve member 16' is movable between opened and closed positions. Upper spout portion 12' is joined to lower fitment portion 14' so that valve member 16 is held captive therein for reciprocable movement within the closure body.

This embodiment of the present closure assembly further includes a cover 18' for fitment to the closure body for closing the upper spout portion 12', In this embodiment, tamper-evidence is provided by a tamper-evident sleeve 20' which includes an upper removable sleeve portion 21, and a lower sleeve portion 21' configured for non-removable fitment to the associated container. A frangible connection detachably joins the upper and lower sleeve portions 21, 21', whereby removal of the upper sleeve portion permits access to and removal of the cover 18'.

As in the previous embodiment, the reciprocable valve member 16' functions in the nature of a one-way check valve to permit liquid to flow out of the container and through the closure body and out of the upper spout portion 12', while acting to prevent the reverse flow of liquid through the closure body and into the container. FIG. 6 illustrates the valve member 16' in its closed position against the annular valve seat 15' defined by the lower fitment portion 14'.

Thus, in an opened position of the reciprocable valve member 16', wherein it is displaced from the valve seat 15' defined by lower fitment portion 14', liquid can flow outwardly from within the container and into the closure body through the at least one flow passage 26' defined by the lower fitment portion 14'. In the closed, lowered position of the valve member 16', the valve member engages the valve seat 15' and acts to prevent reverse flow of liquid from within the upper spout portion 12' through the valve body into the associated container.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover by the appended claims all such modifications as fall within the scope of the claims.

What is claimed is:

1. An anti-refill closure assembly, comprising:
a closure body having an upper spout portion, and a lower fitment portion configured for securement to an associated container,
said closure body defining at least one flow passage through which liquid from said container enters said closure body, and a valve seat surrounding said flow passage, said closure body including a centrally-positioned guide element; and
a reciprocable valve member positioned within said closure body for movement between opened and closed positions, said valve member including a circular valve head configured for engagement with said valve seat defined by said closure body in the closed position of said valve member, said valve member including a valve shaft extending downwardly from said valve head, said valve shaft being slidably mounted in said guide element of said closure body to provide reciprocable movement of said valve member, said reciprocable valve member in said closed position being generally located between said upper spout portion and said lower fitment portion,
said upper spout portion including a flow opening, the flow opening being formed between a wall and a central element, the wall being outwardly divergent relative to the central element such that the distance between the wall and the central element increases nearer the exit of the closure assembly resulting in a wider flow path,
wherein in said opened position, liquid from within said container flows into said closure body through said at least one flow passage and past said valve member outwardly though said upper spout portion, and in said closed position said valve member acts to prevent flow of liquid from said upper spout portion through said at least one flow passage and into said associated container.

2. The anti-refill closure assembly in accordance with claim 1, further including at least one vent flow path providing communication between the interior of said closure body, downstream of said valve member, and the exterior of said closure body, so the liquid introduced into said closure body through said upper spout portion can flow outwardly through said vent flow path when said valve member is in said closed position.

3. The anti-refill closure assembly in accordance with claim 1, wherein said closure body defining a plurality of elongated flow passages through which liquid from said container enters said closure body.

4. The anti-refill closure assembly in accordance with claim 3, wherein said closure body defines at least ten of said elongated flow passages arranged in parallel relationship with each other.

5. The anti-refill closure assembly in accordance with claim 1, further including an outer cover for fitment to said closure body to close said upper spout portion, said outer cover including a locking element engageable with said valve head of said valve member for maintaining said valve member in said closed position when said outer cover is fitted to said closure body.

6. The anti-refill closure assembly in accordance with claim 1, wherein said closure body includes a lower fitment portion which defines said at least one flow passage and includes said centrally-positioned guide element, and an upper spout portion joined to said lower fitment portion.

7. The anti-refill closure assembly in accordance with claim 1, wherein said valve head of said valve member defines an upwardly facing, non-horizontal surface, so that lateral liquid flow impinging on the surface induces a vertical force component in said valve member to urge said valve member into engagement with said annular valve seat.

8. The anti-refill closure assembly in accordance with claim 1, wherein said annular valve seat is recessed to receive a peripheral portion of said valve head of said valve member, to thereby limit exposure of a lower surface of said valve head to liquid pressure from liquid introduced into said closure assembly through said upper spout portion.

9. An anti-refill closure assembly, comprising:
   a closure body having an upper spout portion, and a lower fitment portion configured for securement to an associated container,
   said closure body defining a plurality of elongated flow passages through which liquid from said container enters said closure body, the elongated flow passages being sized to collectively permit liquid to flow from a container while venting air into the container; and
   a reciprocable valve member positioned within said closure body for movement between opened and closed positions, said reciprocable valve member in said closed position being generally located between said upper spout portion and said lower fitment portion,
   said upper spout portion including a flow opening, the flow opening being formed between a wall and a central element, the wall being outwardly divergent relative to the central element such that the distance between the wall and the central element increases nearer the exit of the closure assembly resulting in a wider flow path,
   wherein in said opened position, liquid from within said container flows into said closure body through at least some of said plurality of flow passages and past said valve member outwardly though said upper spout portion, and in said closed position said valve member acts to prevent flow of liquid from said upper spout portion through said at least one flow passage and into said associated container.

10. The anti-refill closure assembly in accordance with claim 9, further including at least one vent flow path providing communication between the interior of said closure body, downstream of said valve member, and the exterior of said closure body, so the liquid introduced into said closure body through said upper spout portion can flow outwardly through said vent flow path when said valve member is in said closed position.

11. The anti-refill closure assembly in accordance with claim 9, wherein said valve member includes a circular valve head, and a valve shaft extending downwardly from said valve head, said valve shaft being slidably mounted in said closure body to provide reciprocable movement of said valve member.

12. The anti-refill closure assembly in accordance with claim 9, wherein said closure body defines at least ten of said elongated flow passages arranged in parallel relationship with each other.

13. The anti-refill closure assembly in accordance with claim 9, wherein each of the plurality of flow passages has an internal diameter of from about 0.020 to about 0.3 inches.

14. The anti-refill closure assembly in accordance with claim 9, wherein the plurality of flow passages is sized to inhibit flow of liquid from being introduced into the container.

15. The anti-refill closure assembly in accordance with claim 9, further including an outer cover for fitment to said closure body to close said upper spout portion, said outer cover including a locking element engageable with said valve head of said valve member for maintaining said valve member in said closed position when said outer cover is fitted to said closure body.

16. The anti-refill closure assembly in accordance with claim 9, further including an outer cover for fitment to said closure body for closing said upper spout portion, said outer cover including a lower sleeve portion configured for non-removable fitment to an outer surface of said associated container.

17. A container including an anti-refill closure assembly, comprising:
   a container including a neck portion; and
   an anti-refill closure assembly including a closure body and a reciprocable valve member, said closure body having an upper spout portion, and a lower fitment portion secured to said neck portion of said container, said closure body defining at least one flow passage through which liquid from said container enters said closure body, and a valve seat surrounding said flow passage, said closure body including a centrally-positioned guide element,
   said reciprocable valve member positioned within said closure body for movement between opened and closed positions, said valve member including a circular valve head configured for engagement with said valve seat defined by said closure body in the closed position of said valve member, said valve member including a valve shaft extending downwardly from said valve head, said valve shaft being slidably mounted in said guide element of said closure body to provide reciprocable movement of said valve member, said reciprocable valve member in said closed position being generally located between said upper spout portion and said lower fitment portion,
   said upper spout portion including a flow opening, the flow opening being formed between a wall and a central element, the wall being outwardly divergent relative to the central element such that the distance between the wall and the central element increases nearer the exit of the closure assembly resulting in a wider flow path,
   wherein in said opened position, liquid from within said container flows into said closure body through said at least one flow passage and past said valve member outwardly though said upper spout portion, and in said closed position said valve member acts to prevent flow of liquid from said upper spout portion through said at least one flow passage and into said container.

18. The container in accordance with claim 17, further including at least one vent flow path providing communication between the interior of said closure body, downstream of said valve member, and the exterior of said closure body, so the liquid introduced into said closure body through said upper spout portion can flow outwardly through said vent flow path when said valve member is in said closed position.

19. The container in accordance with claim 17, wherein said closure body defining a plurality of elongated flow passages through which liquid from said container enters said closure body.

20. The container in accordance with claim 19, wherein said closure body defines at least ten of said elongated flow passages arranged in parallel relationship with each other.

21. The container in accordance with claim 17, further including an outer cover for fitment to said closure body to close said upper spout portion, said outer cover including a locking element engageable with said valve head of said valve member for maintaining said valve member in said closed position when said outer cover is fitted to said closure body.

22. The container in accordance with claim 17, wherein said valve head of said valve member defines an upwardly facing, non-horizontal surface, so that lateral liquid flow impinging on the surface induces a vertical force component in said valve member to urge said valve member into engagement with said annular valve seat.

23. A container including an anti-refill closure assembly, comprising:
- a container including a neck portion; and
- an anti-refill closure assembly including a closure body and a reciprocable valve member, said closure body having an upper spout portion, and a lower fitment portion secured to said neck portion of said container, said closure body defining a plurality of elongated flow passages through which liquid from said container enters said closure body, the elongated flow passages being sized to collectively permit liquid to flow from a container while venting air into the container; and
- said reciprocable valve member positioned within said closure body for movement between opened and closed positions, said reciprocable valve member in said closed position being generally located between said upper spout portion and said lower fitment portion,
- said upper spout portion including a flow opening, the flow opening being formed between a wall and a central element, the wall being outwardly divergent relative to the central element such that the distance between the wall and the central element increases nearer the exit of the closure assembly resulting in a wider flow path,
- wherein in said opened position, liquid from within said container flows into said closure body through at least some of said plurality of flow passages and past said valve member outwardly though said upper spout portion, and in said closed position said valve member acts to prevent flow of liquid from said upper spout portion through said at least one flow passage and into said associated container.

24. The anti-refill closure assembly in accordance with claim 23, further including at least one vent flow path providing communication between the interior of said closure body, downstream of said valve member, and the exterior of said closure body, so the liquid introduced into said closure body through said upper spout portion can flow outwardly through said vent flow path when said valve member is in said closed position.

25. The anti-refill closure assembly in accordance with claim 23, wherein said valve member includes a circular valve head, and a valve shaft extending downwardly from said valve head, said valve shaft being slidably mounted in said closure body to provide reciprocable movement of said valve member.

26. The anti-refill closure assembly in accordance with claim 23, wherein said closure body defines at least ten of said elongated flow passages arranged in parallel relationship with each other.

27. The anti-refill closure assembly in accordance with claim 23, wherein each of the plurality of flow passages has an internal diameter of from about 0.020 to about 0.3 inches.

28. The anti-refill closure assembly in accordance with claim 23, wherein the plurality of flow passages is sized to inhibit flow of liquid from being introduced into the container.

29. The anti-refill closure assembly in accordance with claim 23, further including an outer cover for fitment to said closure body to close said upper spout portion, said outer cover including a locking element engageable with said valve head of said valve member for maintaining said valve member in said closed position when said outer cover is fitted to said closure body.

30. The anti-refill closure assembly in accordance with claim 23, further including an outer cover for fitment to said closure body for closing said upper spout portion, said outer cover including a lower sleeve portion configured for non-removable fitment to an outer surface of said associated container.

31. An anti-refill closure assembly, comprising:
- a closure body having an upper spout portion, and a lower fitment portion configured for securement to an associated container,
- said closure body defining at least one flow passage through which liquid from said container enters said closure body, and a valve seat surrounding said flow passage, said closure body including a centrally-positioned guide element; and
- a reciprocable valve member positioned within said closure body for movement between opened and closed positions, said valve member including a circular valve head configured for engagement with said valve seat defined by said closure body in the closed position of said valve member, said valve member including a valve shaft extending downwardly from said valve head, said valve shaft being slidably mounted in said guide element of said closure body to provide reciprocable movement of said valve member, said reciprocable valve member in said closed position being generally located between said upper spout portion and said lower fitment portion,
- said upper spout portion including a flow opening, the flow opening being formed between a wall and a central element, the wall being outwardly divergent relative to the central element such that the distance between the wall and the central element increases nearer the exit of the closure assembly resulting in a wider flow path,
- an outer cover for fitment to said closure body for closing said upper spout portion, said outer cover including a lower sleeve portion configured for non-removable fitment to an outer surface of said associated container,
- wherein in said opened position, liquid from within said container flows into said closure body through said at least one flow passage and past said valve member outwardly though said upper spout portion, and in said closed position said valve member acts to prevent flow of liquid from said upper spout portion through said at least one flow passage and into said associated container.

32. The anti-refill closure assembly in accordance with claim 31, wherein said outer cover further includes an upper internally thread cap portion, said upper internally thread cap portion being joined to said lower sleeve portion via a frangible connection.

33. The anti-refill closure assembly in accordance with claim 31, further including at least one vent flow path providing communication between the interior of said closure body, downstream of said valve member, and the exterior of said closure body, so the liquid introduced into said closure body through said upper spout portion can flow outwardly through said vent flow path when said valve member is in said closed position.

34. The anti-refill closure assembly in accordance with claim 31, wherein said closure body defining a plurality of elongated flow passages through which liquid from said container enters said closure body.

35. The anti-refill closure assembly in accordance with claim 31, wherein said outer cover includes a locking element engageable with said valve head of said valve member for maintaining said valve member in said closed position when said outer cover is fitted to said closure body.

36. The anti-refill closure assembly in accordance with claim 31, wherein said closure body includes a lower fitment portion which defines said at least one flow passage and includes said centrally-positioned guide element, and an upper spout portion joined to said lower fitment portion.

37. The anti-refill closure assembly in accordance with claim 31, wherein said valve head of said valve member defines an upwardly facing, non-horizontal surface, so that lateral liquid flow impinging on the surface induces a vertical force component in said valve member to urge said valve member into engagement with said annular valve seat.

38. The anti-refill closure assembly in accordance with claim 31, wherein said annular valve seat is recessed to receive a peripheral portion of said valve head of said valve member, to thereby limit exposure of a lower surface of said valve head to liquid pressure from liquid introduced into said closure assembly through said upper spout portion.

* * * * *